US007091983B1

(12) United States Patent
Donovan

(10) Patent No.: US 7,091,983 B1
(45) Date of Patent: Aug. 15, 2006

(54) COORDINATE WRAPPING FOR ANISOTROPIC FILTERING OF NON-POWER OF TWO TEXTURES

(75) Inventor: Walter E. Donovan, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/854,618

(22) Filed: May 26, 2004

(51) Int. Cl.
 *G06T 15/60* (2006.01)
 *G09G 5/00* (2006.01)
 *G06T 17/00* (2006.01)
 *G06K 9/40* (2006.01)

(52) U.S. Cl. .................... 345/582; 345/426; 345/428; 345/586; 382/265

(58) Field of Classification Search ........ 345/581–588, 345/418–428, 606–607, 611, 646–647, 561, 345/572; 382/260, 265, 269, 300
See application file for complete search history.

(56) References Cited

U.S. PATENT DOCUMENTS

| 5,877,771 | A | * | 3/1999 | Drebin et al. ............... 345/586 |
| 6,040,837 | A | | 3/2000 | Wong et al. |
| 6,292,193 | B1 | * | 9/2001 | Perry et al. ................. 345/582 |
| 6,876,362 | B1 | * | 4/2005 | Newhall et al. ............ 345/426 |
| 6,919,904 | B1 | * | 7/2005 | Kilgariff ..................... 345/426 |
| 2003/0080963 | A1 | * | 5/2003 | Van Hook et al. .......... 345/501 |
| 2003/0164840 | A1 | * | 9/2003 | O'Driscoll .................. 345/611 |

OTHER PUBLICATIONS

Talisman 3D Technology Briefing, Talisman Graphics & Multimedia System.

McCormack, Joe, et al., "Feline: Fast Elliptical Lines for Anisotropic Texture Mapping," Mitsubishi Electric Information Technology Center America, 2000.

Greene, Ned, et al., "Creating Raster Omnimax Images from Multiple Perspective Views Using the Elliptical Weighted Average Filter," IEEE Computer Graphics and Applications, vol. 6, Issue 6, pp. 21-27, Jun. 1986.

Williams, Lance, "Pyramidal Parametrics," Computer Graphics, vol. 17, No. 3, Jul. 1983.

Heckbert, Paul S., "Fundamentals of Texture Mapping and Image Warping," *Master's Thesis*, Dept. of Electrical Engineering and Computer Science, University of California, Berkeley, CA, Jun. 17, 1989.

"ATI's Optimized Texture Filtering Called Into Question," Tom's Hardware Guide, Dec. 17, 2004. <http://www20.graphics.tomshardware.com/graphic/20040603/index.html>.

Heckbert, Paul, "Texture Mapping Polygons In Perspective," Computer Graphics Lab, New York Institute of Technology, Technical Memo No. 13, Apr. 28, 1983.

Barkans, Anthony C., "High Quality Rendering Using the Talisman Architecture," 1997 SIGGRAPH/Eurographics Workshop, 1997, pp. 79-88.

"Anisotropic Texture Filtering," Feb. 1998, Microsoft Corporation.

* cited by examiner

*Primary Examiner*—Wesner Sajous
(74) *Attorney, Agent, or Firm*—Patterson & Sheridan, L.L.P.

(57) ABSTRACT

An apparatus and method for using non-power of two texture maps with anisotropic filtering is described. An anisotropic perturbation is applied to a texture map coordinate to produce a perturbed texture coordinate. A wrapped texture map index for various wrap modes is computed using the perturbed texture coordinate and an LOD width. In addition to the anisotropic perturbation, the perturbed texture coordinate may also include a tap perturbation.

20 Claims, 14 Drawing Sheets

PRIOR ART

PRIOR ART

US 7,091,983 B1

COORDINATE WRAPPING FOR ANISOTROPIC FILTERING OF NON-POWER OF TWO TEXTURES

FIELD OF THE INVENTION

One or more aspects of the invention generally relate to computer graphics, and more particularly to anisotropic filtering of texture map data.

BACKGROUND

Conventional graphics processors are exemplified by systems and methods developed to read and filter texture map samples. To simplify the texture map filtering performed within a graphics processor, a texture is prefiltered and various resolutions of the prefiltered texture are stored as mip mapped texture maps. FIG. 1A is a conceptual diagram of prior art showing a mip mapped texture including a highest resolution texture map, Texture Map 101. A Texture Map 102, a Texture Map 103, and a Texture Map 104 are successively lower resolution texture maps, mip maps, each storing prefiltered texture samples.

Classic mip maps are isotropically filtered, i.e. filtered symmetrically in the horizontal and vertical directions using a square filter pattern. Isotropically filtered mip maps result in high quality images for surfaces with major and minor texture axis that are similar in length. However, when an isotropically filtered texture is applied to a receding surface viewed "on edge", aliasing artifacts (blurring) become apparent to a viewer as the texture is effectively "stretched" in one dimension, the receding direction, as the texture is applied to the surface. A Footprint 115 is a pixel footprint in texture space, with a Position 135 being the pixel center. FIG. 1B illustrates a prior art application of Texture Map 101 applied to pixels of a Surface 140 that is receding in image space. When viewed in image space, Footprint 115 (an ellipse) appears as Footprint 116 (a circle). While isotropic filtering of texture samples within a pixel footprint that forms a circle in texture space results in a high-quality image, isotropic filtering of texture samples within a pixel footprint that forms an ellipse, such as Footprint 115, results in an image with aliasing artifacts. In contrast to isotropic filtering, anisotropic filtering uses a rectangular shaped filter pattern, resulting in fewer aliasing artifacts for footprints with major and minor axes that are not similar in length in texture space.

FIG. 1C illustrates Footprint 115 including a Minor Axis 125 that is significantly shorter than a Major Axis 130. FIG. 1D illustrates a prior art application of anisotropic filtering of Texture Samples 150 along Major Axis 130. Texture Samples 150 read from one or more mip maps are anisotropically filtered to produce a filtered texture sample. However, as shown in FIG. 1A a portion of Footprint 115 may lie outside of Texture 101, and Texture 101 will be "wrapped" (as shown in FIGS. 2A and 2B) to fill the portion of Footprint 115.

Traditionally texture map dimensions are powers of two in order to simplify computations used to convert from texture parameters represented in surface space to texture coordinates represented in texture space. Specifically, a texture map dimension, n, that is a power of two may be expressed as $n=2^i$, where i is an integer. The texture coordinates are used to read texture map samples from memory. Power of two texture maps are also used to simplify computations used to support the wrap modes shown in FIGS. 2A and 2B. FIG. 2A illustrates a texture map applied to a square surface using a "repeat" wrap mode. FIG. 2B illustrates a texture map applied using a "mirror" wrap mode. When non power of two texture maps, such as a video image that has not been resampled, are used, computing wrapped texture coordinates is more difficult, i.e., requiring division by an arbitrary value.

Accordingly, there is a need to use non-power of two texture maps, such as a video image. Furthermore, there is a need to apply non-power of two texture map to a surface using a wrap mode, such as repeat or mirror wrap mode; there is also a need to use such techniques in combination with anisotropic filtering.

SUMMARY

The current invention involves new systems and methods for using non-power of two texture maps. A non-power of two dimension image may be used as texture map without resampling to produce a power of two dimension texture map. Furthermore, the non-power of two texture map may be anisotropically filtered and applied to a surface using various wrap modes.

Various embodiments of a method of the invention include receiving a texture map coordinate corresponding to a non-power of two texture map, receiving an LOD width corresponding to the non-power of two texture map, applying an anisotropic perturbation to the texture map coordinate to produce a perturbed texture map coordinate, computing a texture map index based on the perturbed texture map coordinate, determining whether the texture map index is positioned outside of the non-power of two texture map, and computing a wrapped texture map index based on the texture map index and the LOD width when the texture map index is outside of the non-power of two texture map.

Various embodiments of the invention include an anisotropic unit for determining texture map indices for non-power of two texture maps. The anisotropic unit includes a perturbation unit, an index computation unit, and an anisotropic wrap unit. The perturbation unit is configured to apply a perturbation to a texture coordinate corresponding to a non-power of two texture map and produce a perturbed texture coordinate. The index computation unit is configured to receive the perturbed texture coordinates and produce a texture map index. The anisotropic wrap unit is configured to receive the texture map index and produce a wrapped texture map index for the non-power of two texture map responsive to a wrap mode.

Various embodiments of the invention include a programmable graphics processor for using non-power of two texture maps.

BRIEF DESCRIPTION OF THE VARIOUS VIEWS OF THE DRAWINGS

Accompanying drawing(s) show exemplary embodiment (s) in accordance with one or more aspects of the present invention; however, the accompanying drawing(s) should not be taken to limit the present invention to the embodiment (s) shown, but are for explanation and understanding only.

FIG. 1A is a diagram of prior art showing a mip mapped texture map.

FIGS. 1B, 1C, and 1D illustrate a prior art application of texture samples to a surface.

DISCLOSURE OF THE INVENTION

Figure 1A:
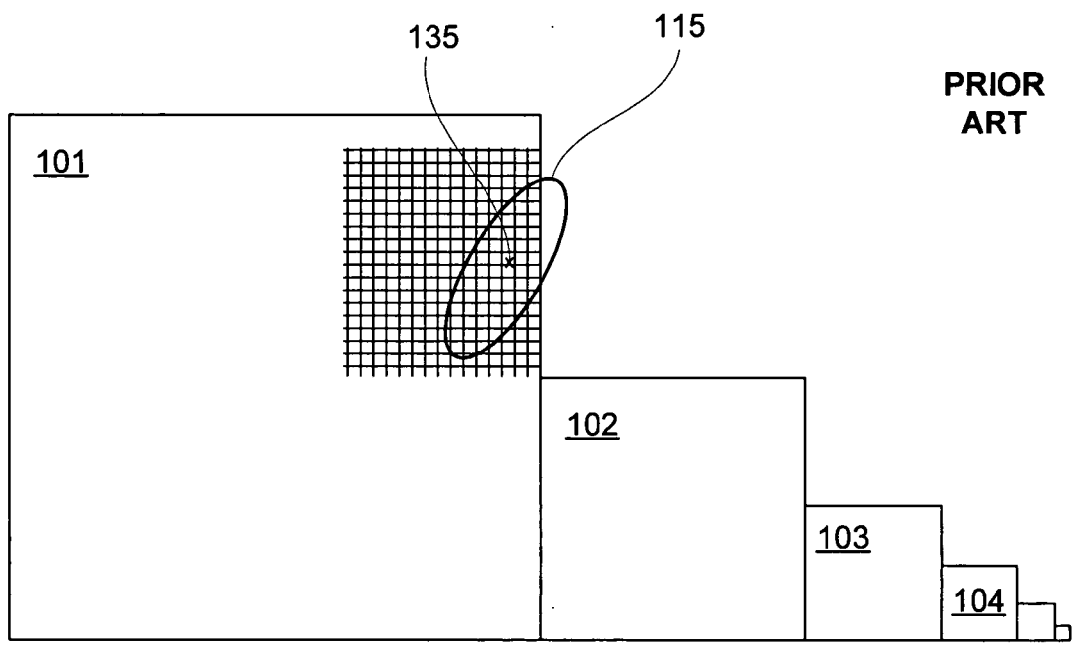
Figure 1B:
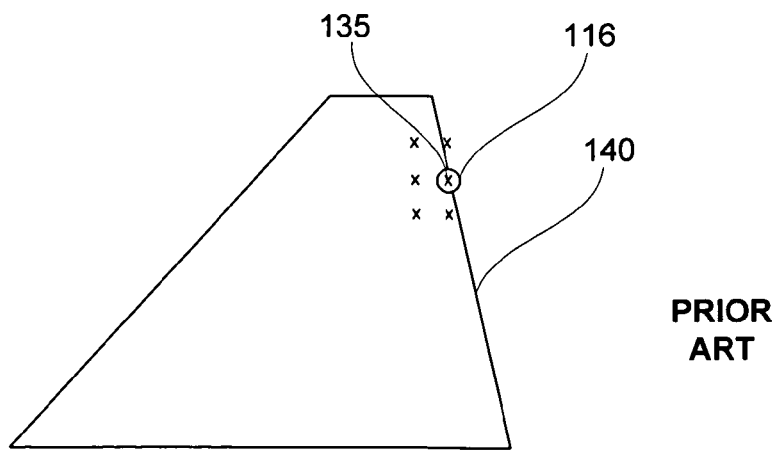
Figure 1C:
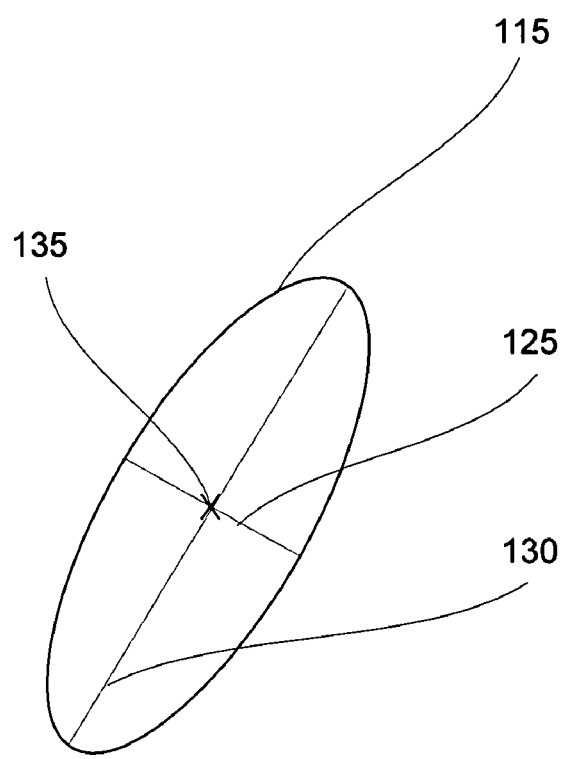
Figure 1D:
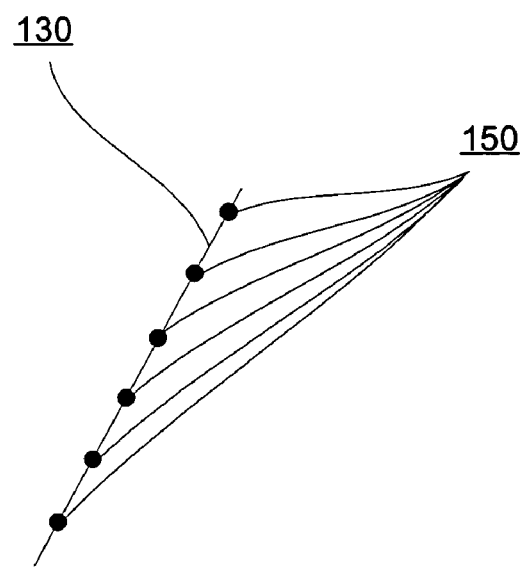
Figure 2A:
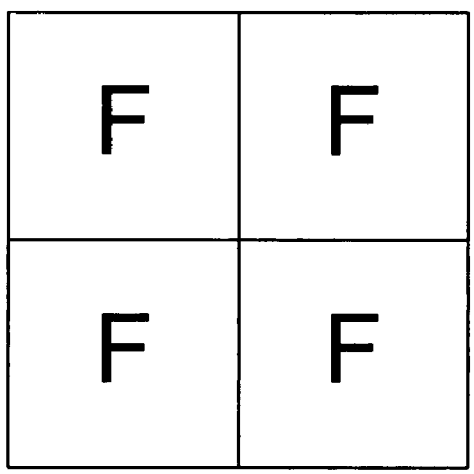
FIG. 2A illustrates a prior art application of a texture map to a surface using a repeat wrap mode.
Figure 2B:
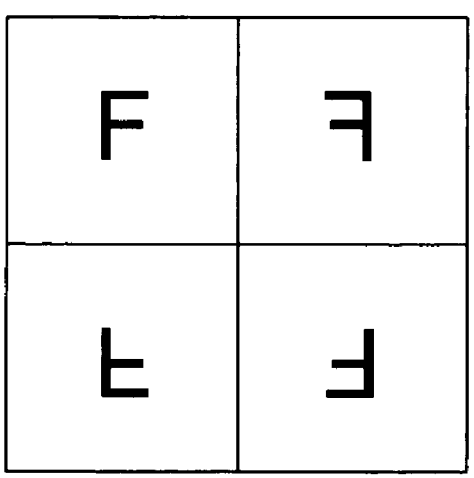
FIG. 2B illustrates a prior art application of a texture map to a surface using a mirror wrap mode.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

In conventional graphics processing, an image with a non-power of two dimension, such as a video frame, is resampled to produce a power of two texture map that is designated as the highest resolution level of detail (LOD) texture map, LOD0. More recently, a non-power of two texture map designated as LOD0 may be an image that has not been resampled, such as a video frame. Mip map texture maps that are filtered versions of the image may be generated such that each dimension of a mip map texture map is an arbitrary value, in particular, not a power of two.

For example, in a first embodiment a LOD0 texture map is 223×223 texels, a LOD1 texture map is 112×112 texels, a LOD2 texture map is 56×56 texels, a LOD3 texture map is 28×28 texels, and so forth. In a second embodiment, a LOD0 texture map is 223×223 texels, a LOD1 texture map is 157×157 texels, a LOD2 texture map is 111×111 texels, a LOD3 texture map is 78×78 texels, and so forth. Therefore, a dimension of a mip map texture map may be greater than half of the corresponding dimension in the adjacent higher resolution map. In a third embodiment, a LOD0 texture map is 223×223 texels, a LOD1 texture map is 111×111 texels, a LOD2 texture map is 55×55 texels, a LOD3 texture map is 27×27 texels, and so forth. Therefore, a dimension of a mip map texture map may be less than half of the corresponding dimension in the adjacent higher resolution map. In an alternate embodiment, an LOD0 texture map and mip map texture maps are rectangular non-power of two texture maps. In a further alternate embodiment, LOD0 texture map and mip map texture maps are more than two dimensions.

Each texel within a texture map corresponds to unnormalized texture coordinates, such as u, v, and p, that are dependent on the texture map size. Unnormalized texture coordinates, e.g., u, v, and p, for a 223×223 texture map range from 0 to 222 and are typically represented in a fixed point format. Unnormalized texture coordinates associated with a surface are determined, using techniques known to those skilled in the art, based on normalized texture coordinates, such as s t, and r, corresponding to each pixel within the surface. The normalized texture coordinates are typically represented in a floating point format, where a value ranging from 0.0 to 1.0 covers each LOD of the texture map. Normalized texture coordinates may take on a value outside of the range (0.0 to 1.0), and the wrap mode determines how a value outside of the range will be changed to a value within the range. The unnormalized coordinates for an LOD of the texture map are computed using the normalized coordinates:

$u = s * \text{LOD width}$, where LOD width is the number of texels across a dimension, e.g., width, height, depth, or the like, of the LOD of the texture map. Likewise, v is computed using t and p is computed using r.

Texture indices computed based on the unnormalized texture coordinates are used to specify a particular texel and compute an address that is used to read the texel from memory. Texel indices are integers represented in index coordinate space, such as i, j, and k. For example, the texel indices for bilinearly filtered texels are computed using the unnormalized coordinates:

$i_0 = \text{floor}(u - 0.5)$ and $i_1 = \text{floor}(u - 0.5) + 1$, where $i_0$ and $i_1$ are indices within one LOD of the texture map. Likewise, j indices are computed using v and k indices are computed using p. When the indices lie outside of the texture map, they are wrapped dependent on a wrap mode to lie inside the texture map, as described further herein.

Figure 3A:
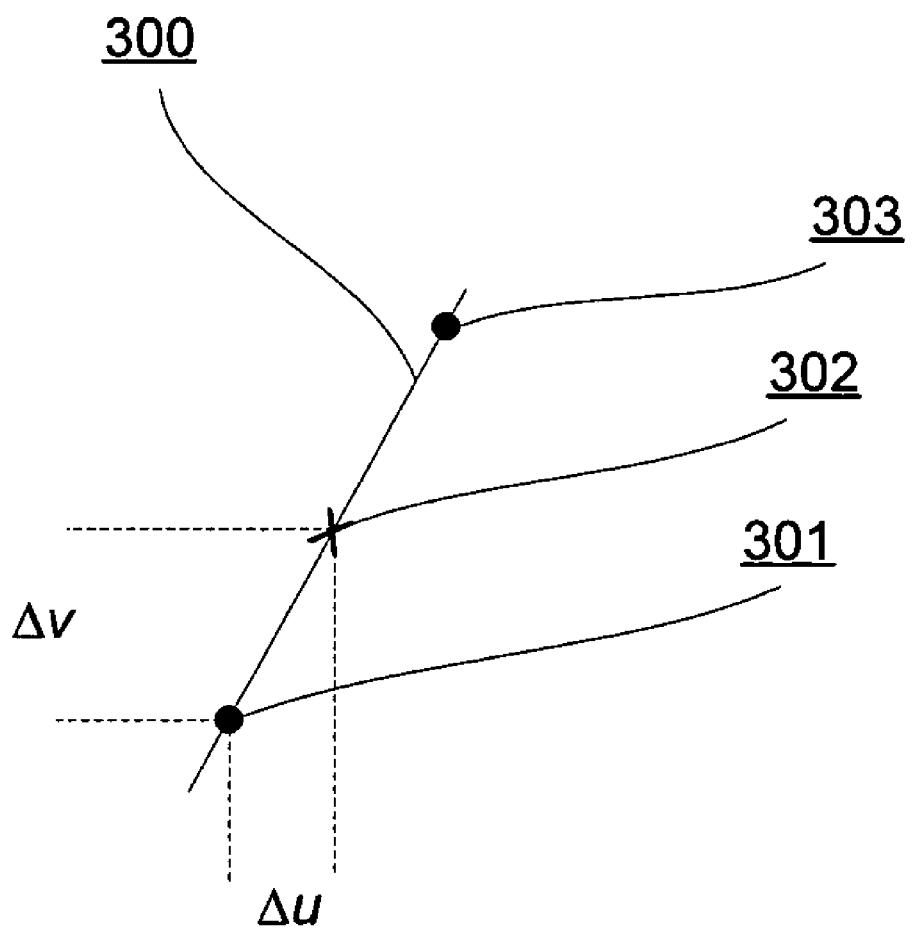
FIG. 3A illustrates perturbed texture coordinates in accordance with one or more aspects of the present invention.

When anisotropic filtering is used, the unnormalized texture coordinates are perturbed to generate perturbed texture coordinates for two or more texels within a footprint. FIG. 3A illustrates perturbed texture coordinates in accordance with one or more aspects of the present invention. A Position 302 is located along a Major Axis 300 at the unnormalized texture coordinates. A Position 301 corresponds to a first pair of perturbed texture coordinates and a Position 303 corresponds to a second pair of perturbed texture coordinates. An anisotropic perturbation may range in value from zero to half of a maximum anisotropic ratio (major axis/minor axis) that is used. For example, when 16 to 1 is the maximum anisotropic ratio, the maximum anisotropic perturbation is 8.

A first anisotropic perturbation, Δu is subtracted from the u coordinate for Position 302 to generate the u coordinate for Position 301. Likewise, a second anisotropic perturbation, Δv is subtracted from the v coordinate for Position 302 to generate the v coordinate for Position 301. The first anisotropic perturbation, Δu is added to the u coordinate for Position 302 to generate the u coordinate for Position 303. Likewise, the second anisotropic perturbation, Δv is added to the v coordinate for Position 302 to generate the v coordinate for Position 303. Additional positions may be generated by adding the first and second anisotropic perturbations to Positions 301 and 303 or subtracting the first and second anisotropic perturbations from Positions 301 and 303. In some embodiments, a pair of perturbed texture coordinates, such as those corresponding to Position 301 or Position 303 may lie outside of the texture map. When perturbed texture coordinates are outside of the texture map, the perturbed texture coordinates must be wrapped to lie within the texture map. Likewise, texture indices produced using a perturbed coordinate may lie outside of the texture map and any index outside of the texture map must be wrapped to lie within the texture map. Rather than performing two wrapping operations, texture indices may be computed using the (unwrapped) perturbed texture coordinates and wrap operations may be performed on the texture indices to produce wrapped texture indices, as described further herein.

Figure 3B:
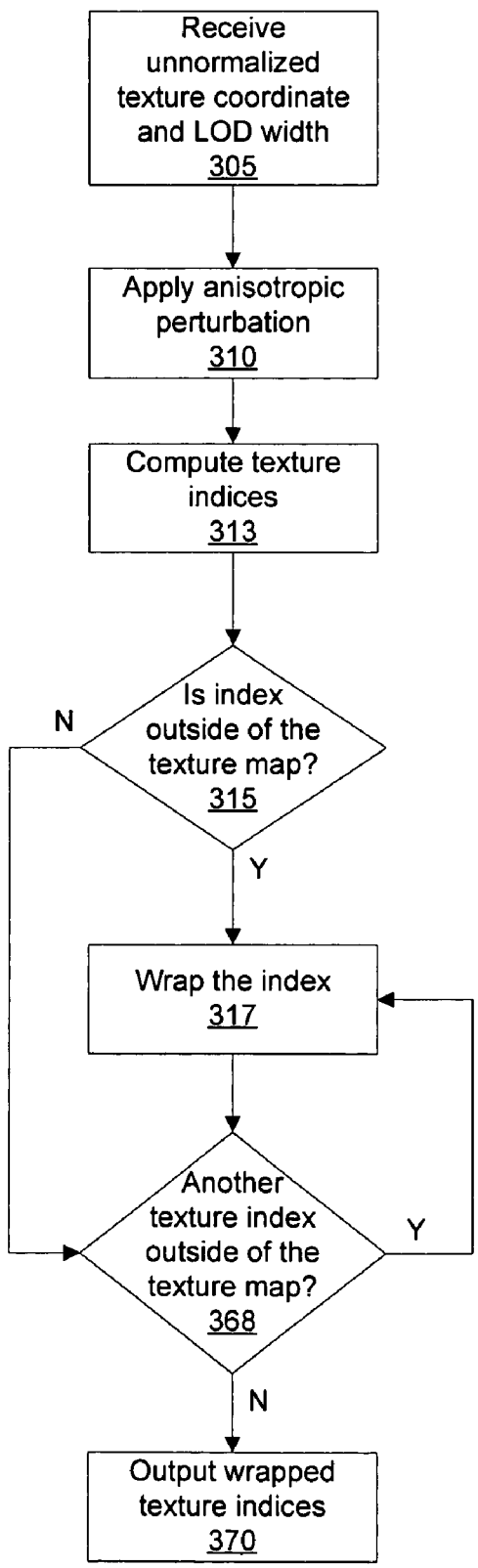
FIG. 3B illustrates an embodiment of a method of producing a wrapped texture map coordinate for a non-power of two texture map in accordance with one or more aspects of the present invention.

FIG. 3B illustrates an embodiment of a method of producing a wrapped texture map coordinate for a non-power of two texture map in accordance with one or more aspects of the present invention. In step 305 an unnormalized texture coordinate, such as u or v is received. A LOD specifying a specific texture map within a set of mip mapped texture maps is determined using a technique known to those skilled in the art. In step 305 the width of the texture map corresponding to the LOD, LOD width, is also received. For example, when LOD0 is used for a 223×223 texel texture map, the LOD width received for is 223. The LOD width may be any integer greater than zero.

In step 310 an anisotropic perturbation is applied to the normalized texture coordinate to generate a perturbed texture coordinate. In one embodiment, the anisotropic perturbation is added to the unnormalized texture coordinate. For example, a perturbed texture coordinate, $u_0'$, may be computed as:

$$u_0'=u+\Delta u.$$

Alternatively, the anisotropic perturbation is subtracted from the unnormalized texture coordinate. For example, another perturbed texture coordinate, $u_1'$, may be computed as:

$$u_1'=u-\Delta u.$$

In step 313 one or more texture indices are computed using each perturbed texture coordinate. For example, when point sampling, i.e., a single tap, is used to filter a texel, one index, i, may be computed as the integer portion of the perturbed texture coordinate: $i=\text{floor}(u_0'-0.5)$. Four indices (two indices for each dimension) may be computed for each perturbed texture coordinate when texels are bilinearly filtered, i.e., filtered using a four tap filter, as described further herein in conjunction with FIG. 4.

In step 315 the method determines if a texture index computed in step 313 lies outside of the texture map corresponding to the LOD, and, if not, the texture index is the wrapped texture index and the method proceeds to step 368. Otherwise, the method proceeds to step 317. When a repeat or "clamp to edge" wrap mode is used, the texture index lies outside of the texture map when the texture index is less than zero, greater than the LOD width, or equal to the LOD width. When a mirror wrap mode is used, the texture index lies outside of the texture map when the texture index is less than zero, greater than twice the LOD width, or equal to twice the LOD width. When a "clamp to border" wrap mode is used, the texture index lies outside of the texture map when the texture index is less than −border size, greater than (border size+LOD width), or equal to (border size+LOD width).

In step 317 the texture index is wrapped, dependent on a wrap mode, to produce a wrapped texture index that lies within the texture map. The wrap mode may be selected by a user, specified for a particular texture map, or determined by an application program. A method for determining the wrapped texture index is described in conjunction with FIG. 3C.

In step 368 the method determines if there is another texture index that lies outside of the texture map, and, if so, then the method returns to step 317. Otherwise, the method proceeds to step 370 and the wrapped texture coordinate is output.

Figure 3C:
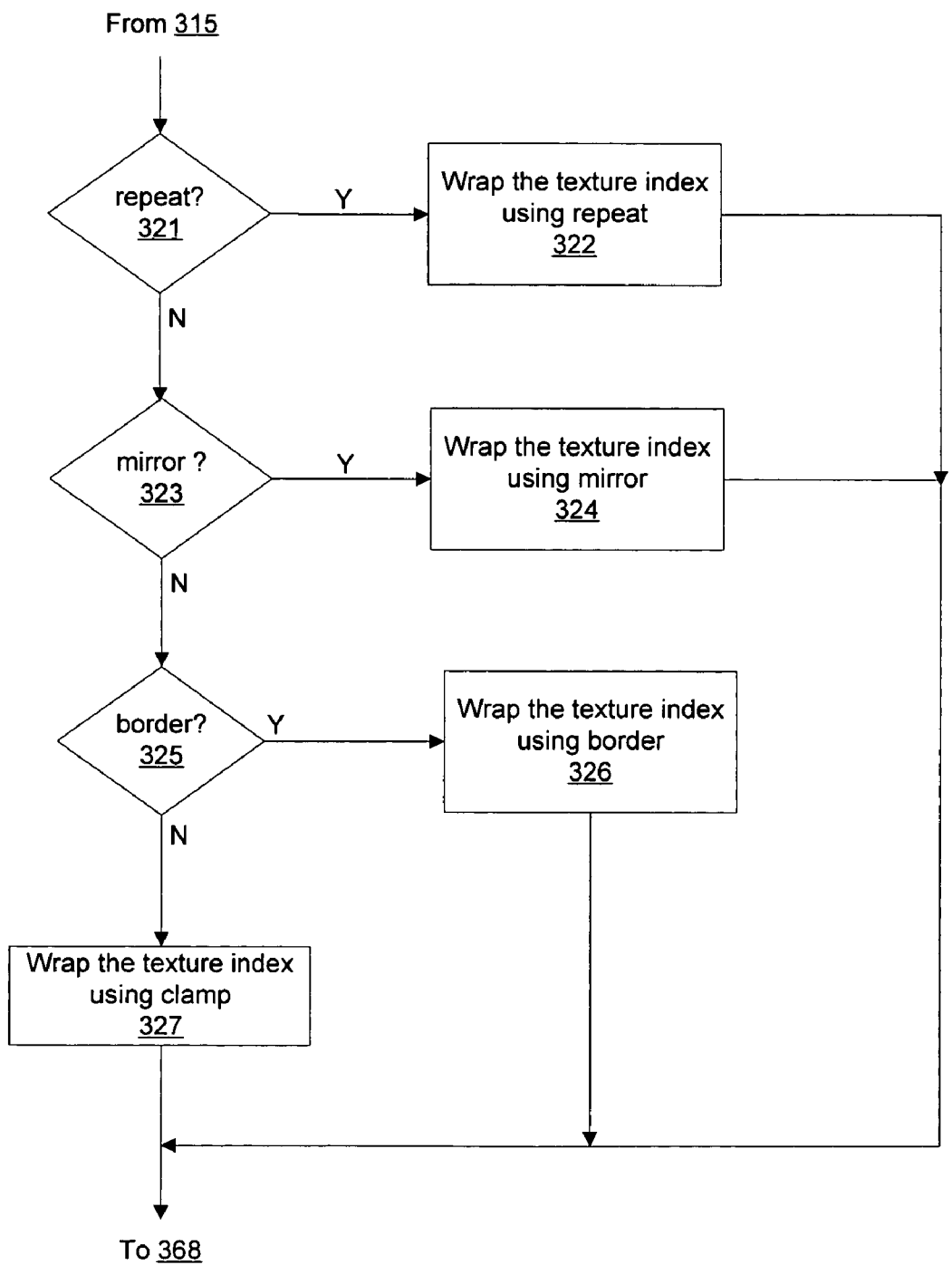
FIG. 3C illustrates an embodiment of a method of producing a wrapped texture map index using a perturbed texture coordinate in accordance with one or more aspects of the present invention.

FIG. 3C illustrates an embodiment of a method of performing step 317 of FIG. 3B, i.e., producing a wrapped texture map index using a perturbed texture coordinate, in accordance with one or more aspects of the present invention. In step 321 the method determines if the wrap mode is repeat, and, if not, the method proceeds to step 323. Otherwise the method proceeds to step 322. In step 322 the wrapped texture index is produced based on the repeat wrap mode, as described in conjunction with FIG. 3F. After completing step 322, the method proceeds to step 368.

In step 323 the method determines if the wrap mode is mirror, and, if not, the method proceeds to step 325. Otherwise the method proceeds to step 324. In step 324 the wrapped texture index is produced based on the mirror wrap mode, as described in conjunction with FIG. 3G. After completing step 324, the method proceeds to step 368.

In step 325 the method determines if the wrap mode is "clamp to border", and, if not, the method proceeds to step 327. Otherwise, in step 326, the wrapped texture index is produced based on the "clamp to border" wrap mode, as described in conjunction with FIG. 3D. In step 327 the wrapped texture index is produced based on the "clamp to edge" wrap mode. After completing step 326 or step 327, the method proceeds to step 368. In an alternate embodiment, other wrap modes, such as mirror one, and the like, are used to produce the wrapped texture index.

Figure 3D:
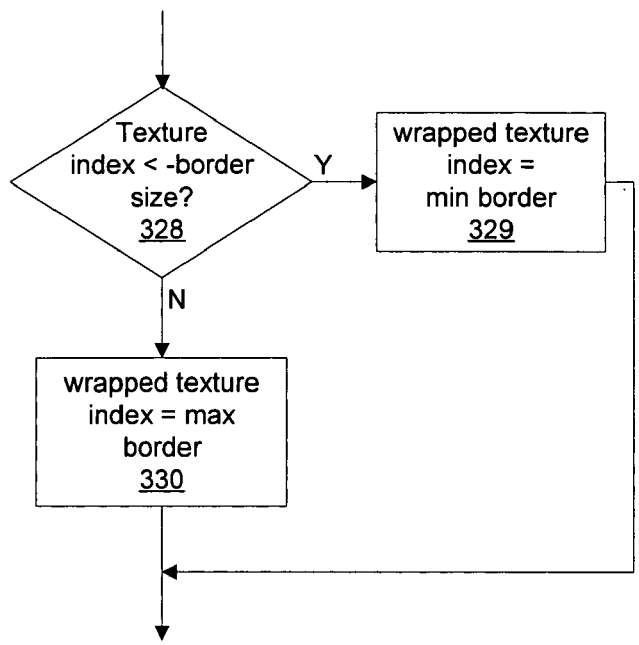
FIG. 3D illustrates an embodiment of a method of producing a wrapped texture index using a perturbed texture coordinate and a "clamp to border" wrap mode in accordance with one or more aspects of the present invention.

FIG. 3D illustrates an embodiment of a method of performing step 326 of FIG. 3C, i.e., producing a "clamp to border" wrapped texture map index using a perturbed texture coordinate in accordance with one or more aspects of the present invention. In step 328 the method determines if the texture index is less than zero, and, if so, in step 329 the wrapped texture index is set to a minimum border value (min border). In some embodiments, the minimum border value is −border size. For example, the minimum border value is −1 when the border size is 1, and when the border size is 4, the minimum border value is −4. If, in step 328, the method determines the texture index is not less than zero, then the texture index must be greater than or equal to (LOD width+border size), because, in step 315 the texture index was determined to lie outside of the texture map. In step 330, the wrapped texture index is set to a maximum border value (max border). The maximum border value may be LOD width when the border size is 1. When the border size is 4, the maximum border value may be an integer from LOD width to (LOD width+3), i.e. (LOD width−1+border size). After completing step 329 or step 330, the method proceeds to step 368.

In another embodiment a function may be used to compute the "clamp to border" wrapped texture index. The code shown in Table 1 represents such a function, where w is the LOD width, wm1 is (LOD width−1), and border_size_clamp is the border size. When use_border_color is asserted, a border color specified by the graphics application programming interface (API) is used instead of the texture data. By way of illustration, the code is defined using C. However, any other language may be used to define the function.

TABLE 1

```
if (is_border_textured)
{
    int i_clamped = MAX(−border_size_clamp, MIN(w +
        border_size_clamp − 1, i) + border_size_clamp);
    i = i_clamped;
        // the only place where i can exceed w
}
else    // there is no border texture
{
    use_border_color = (i < 0) | (i > wm1);
    i = MAX(0, MIN(wm1, i));
}
```

In another embodiment a function may be used to compute a "mirror once clamp to border" wrapped texture index or a "mirror once clamp to edge" wrapped texture index. The code shown in Table 2 represents such a function. By way of illustration, the code is defined using C. However, any other language may be used to define the function.

TABLE 2

```
// if this is border textured, offset by the size of the border
    if (is_border_textured)
    {
        if (i < 0) i = ~i;
        // use the bitwise not of i if i is negative, e.g., −1 maps to 0
        // at this point i >= 0
        i = MIN (w + border_size_clamp − 1, i) + border_size_
        clamp;
    }
    else    // there is no border texture
    {
        if (i < 0) i = ~i;
        // at this point, i >= 0
        use_border_color = i > wm1;
        i = MIN(wm1, i);
    }
```

Figure 3E:
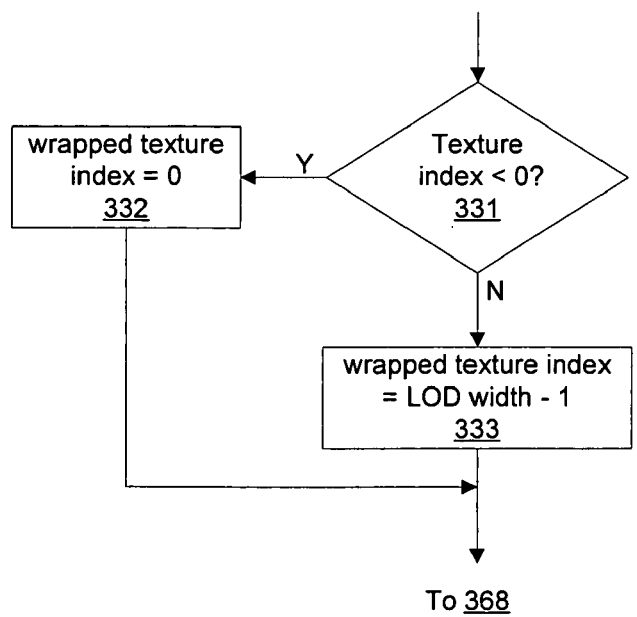
FIG. 3E illustrates an embodiment of a method of producing a wrapped texture index using a perturbed texture coordinate and a "clamp to edge" wrap mode in accordance with one or more aspects of the present invention.

FIG. 3E illustrates an embodiment of a method of performing step 327 of FIG. 3C, i.e., producing a "clamp to edge" wrapped texture map index using a perturbed texture coordinate in accordance with one or more aspects of the present invention. In step 331 the method determines if the texture index is less than zero. If, in step 331 the method determines that the texture index is less than zero, in step 332 the wrapped texture index is set to zero, i.e., the texture index is clamped. If, in step 331 the method determines that the texture index is not less than zero, in step 333 the wrapped texture index is set to the LOD width−1. After completing step 332 or step 333, the method proceeds to step 368.

In an alternative embodiment, step 327 of FIG. 3C is implemented by performing steps 328, 329, and 330 of FIG. 3D, using a border size of 0. In another alternative embodiment, using a clamp Open GL™ wrap mode, the wrapped texture index is set to the LOD width in step 333. In some embodiments a "clamp mirror once" option is supported when the clamp wrap modes (clamp to edge, clamp to border, and the like) are used and in step 313 the index is set to the absolute value of the texture index, i.e., any negative texture index is changed to a positive texture index. When the "clamp mirror once" option is steps 329 and 332 are not completed.

In another embodiment a function may be used to compute the "clamp to edge" wrapped texture index. The code shown in Table 3 represents such a function, where w is the LOD width and wm1 is (LOD width−1). By way of illustration, the code is defined using C. However, any other language may be used to define the function.

TABLE 3

```
i = MAX(0, MIN(wm1, i));
assert (0 <= i && i < w);
```

Figure 3F:
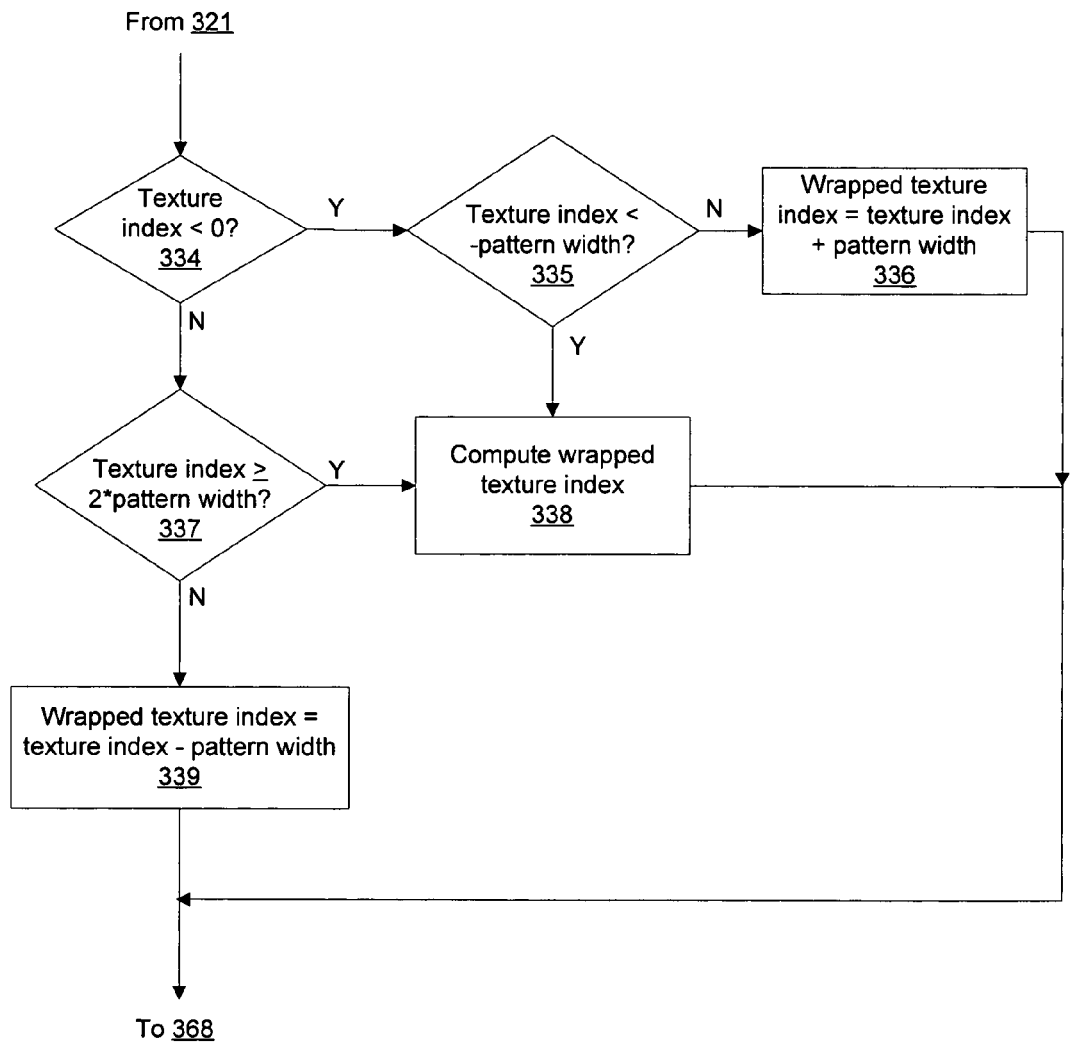
FIG. 3F illustrates an embodiment of a method of producing a wrapped texture index using a perturbed texture coordinate and a repeat wrap mode in accordance with one or more aspects of the present invention.

FIG. 3F illustrates an embodiment of a method of performing step 325 of FIG. 3C, i.e., producing a repeat wrapped texture map index using a perturbed texture coordinate in accordance with one or more aspects of the present invention. When the anisotropic perturbation is less than the LOD width a texture index lying outside of the texture map may be wrapped using a repeat mode by adding or subtracting the LOD width. However, when the anisotropic perturbation is greater than the LOD width the texture index may be more than twice the LOD width and the texture index may not lie within the texture map even after the LOD width has been added to or subtracted from the texture index.

In step 334, the method determines if the texture index is less than 0, and, if so, then the method proceeds to step 335. If, in step 334 the method determines that the texture index is not less than 0, then the method proceeds to step 337. In step 335 the method determines if the texture index is less than −pattern width, where the pattern width is equal to the LOD width when repeat wrap mode is used. The pattern width is equal to twice the LOD width when a mirror wrap mode is used, as described in conjunction with FIG. 3G. If, in step 335 the method determines that the texture index is less than −pattern width, then in step 338 the wrapped texture index, e.g., i', is computed using the following equation:

$$i' = i \bmod (\text{pattern width}),$$

where i is the texture index computed in step 313 and mod is the modulus operator. Using the mod operator extracts only the remainder when i is divided by the pattern width.

When the pattern width is a power of two and i is represented as a binary number, the mod operation may be performed without a divide. However, when the pattern width is an arbitrary positive integer value, a divide is needed. Because the number of pattern width values that are less than the anisotropic perturbation is limited, the divide may be efficiently implemented using a table lookup. In one embodiment, the table stores the wrapped texture indices and is indexed using the pattern width and the texture index.

In one embodiment of a table used to compute the wrapped texture index when the repeat wrap mode is selected and the anisotropic perturbation is not greater than 9 is shown in Table 4. When the repeat mode is used, the pattern width is equal to the LOD width. Table 4 does not include entries for an LOD width of 1 because the only valid integer value for the wrapped texture index is 0. Table 4 does not include entries for LOD widths which are powers of two, such as 2, 4, and 8. Table 4 includes an entry for each LOD width that is less than the anisotropic perturbation. Table 4 also includes an entry for each texture index that is greater than the LOD width.

TABLE 4

| texture index | LOD width | | | | |
|---|---|---|---|---|---|
| | 3 | 5 | 6 | 7 | 9 |
| −9 | 0 | 1 | 3 | 5 | 0 |
| −8 | 1 | 2 | 4 | 6 | 1 |
| −7 | 2 | 3 | 5 | 0 | 2 |
| −6 | 0 | 4 | 0 | 1 | 3 |
| −5 | 1 | 0 | 1 | 2 | 4 |
| −4 | 2 | 1 | 2 | 3 | 5 |
| −3 | 0 | 2 | 3 | 4 | 6 |
| −2 | 1 | 3 | 4 | 5 | 7 |
| −1 | 2 | 4 | 5 | 6 | 8 |
| 0 | 0 | 0 | 0 | 0 | 0 |
| 1 | 1 | 1 | 1 | 1 | 1 |
| 2 | 2 | 2 | 2 | 2 | 2 |
| 3 | 0 | 3 | 3 | 3 | 3 |
| 4 | 1 | 4 | 4 | 4 | 4 |
| 5 | 2 | 0 | 5 | 5 | 5 |
| 6 | 0 | 1 | 0 | 6 | 6 |
| 7 | 1 | 2 | 1 | 0 | 7 |
| 8 | 2 | 3 | 2 | 1 | 8 |
| 9 | 0 | 4 | 3 | 2 | 0 |
| 10 | 1 | 0 | 4 | 3 | 1 |
| 11 | 2 | 1 | 5 | 4 | 2 |
| 12 | 0 | 2 | 0 | 5 | 3 |
| 13 | | 3 | 1 | 6 | 4 |
| 14 | | 4 | 2 | 0 | 5 |
| 15 | | | 3 | 1 | 6 |
| 16 | | | | 2 | 7 |
| 17 | | | | | 8 |
| 18 | | | | | 0 |

In an alternate embodiment, multiple tables are used, each table corresponding to a particular LOD width and wrap mode (repeat or mirror). Each table is indexed using the texture index to read the wrapped texture indices for the particular LOD width.

In another embodiment a function may be used to compute the repeat wrapped texture index. Alternatively, the function may be used to generate wrapped texture indices stored in a repeat wrap lookup table. The code shown in Table 5 represents such a function, where w is the LOD width. ANISODEL is defined as 9 to compensate for any accumulated error that could cause the actual perturbation to be slightly larger than 8. By way of illustration, the code is defined using C. However, any other language may be used to define the function.

TABLE 5

```
#define ANISODEL  9
// max aniso perturbation (8 would probably work)
#define POSDEL    (ANISODEL+1)
// max expected positive delta (add the 1 for the +1 for tap)
#define NEGDEL    (-ANISODEL)   // max expected negative delta
// i coming in for wrap prior to aniso/+1 delta was in range 0. . .w-1.
// the new range is [0,w-1]+[NEGDEL,POSDEL] = -9 . . . w+9
// therefore, for wrap, we need to use the table only if the new u' value
// cannot be brought into proper range by adding or subtracting w once.
// this means that either i' >= 2w or i' < -w
// thus either w+9>=2w or -9 < -w -- the first implies w <= 9 and the
second
// implies w < 9 therefore we need to use the table only for w <= 9
static
int wrap_table (int i, int w)
{
    assert (i >= NEGDEL && i <= w-1 + POSDEL);
    i = i % w;
```

TABLE 5-continued

```
    if (i < 0)
        i += w;       // work around C language misfeature
    return i;
}
```

After producing the wrapped texture index in step 338, the method proceeds to step 368 in FIG. 3B. If, in step 335 the method determines that the texture index is not less than −pattern width, then in step 336 the wrapped texture index, e.g., i', is computed by adding the pattern width to the texture index:

$i' = i + $ pattern width, where i is the texture index computed in step 313.

If, in step 334, the method determines that the texture index is greater than or equal to zero then the texture index must be greater than or equal to the LOD width, because, in step 315 the method determined that the texture index lies outside of the texture map. In step 337 the method determines if the texture index is greater than or equal to twice the pattern width, and, if so, proceeds to complete previously described step 338. Otherwise, In step 339 the wrapped texture index, e.g., i', is computed by subtracting the pattern width (LOD width for the repeat wrap mode) from the texture index:

$i' = i - $ pattern width, where i is the texture index computed in step 313. Following step 336, step 338, or step 339, the method proceeds to step 368 of FIG. 3B.

In another embodiment a function may be used to compute the wrapped texture index when the repeat wrap mode is used. The code shown in Table 4 represents such a function, where w is LOD width, wm1 is (LOD width−1), WRAP_TABLE_LIMIT is the maximum anisotropic perturbation, and the wrap_table function is used to access Table 4, the repeat wrap lookup table, or the like. By way of illustration, the code is defined using C. However, any other language may be used to define the function.

TABLE 6

```
#define POW2(x) (((x)&((x)-1))==0)
if (POW2(w))
    i &= wm1;
else if (w <= WRAP_TABLE_LIMIT)
    i = wrap_table(i, w);   // compute i mod w; output is 0. . .w-1
else if (i < 0)
    i += w;                 // should only have to do once
else if (i >= w)
    i -= w;                 // should only have to do once
```

Figure 3G:
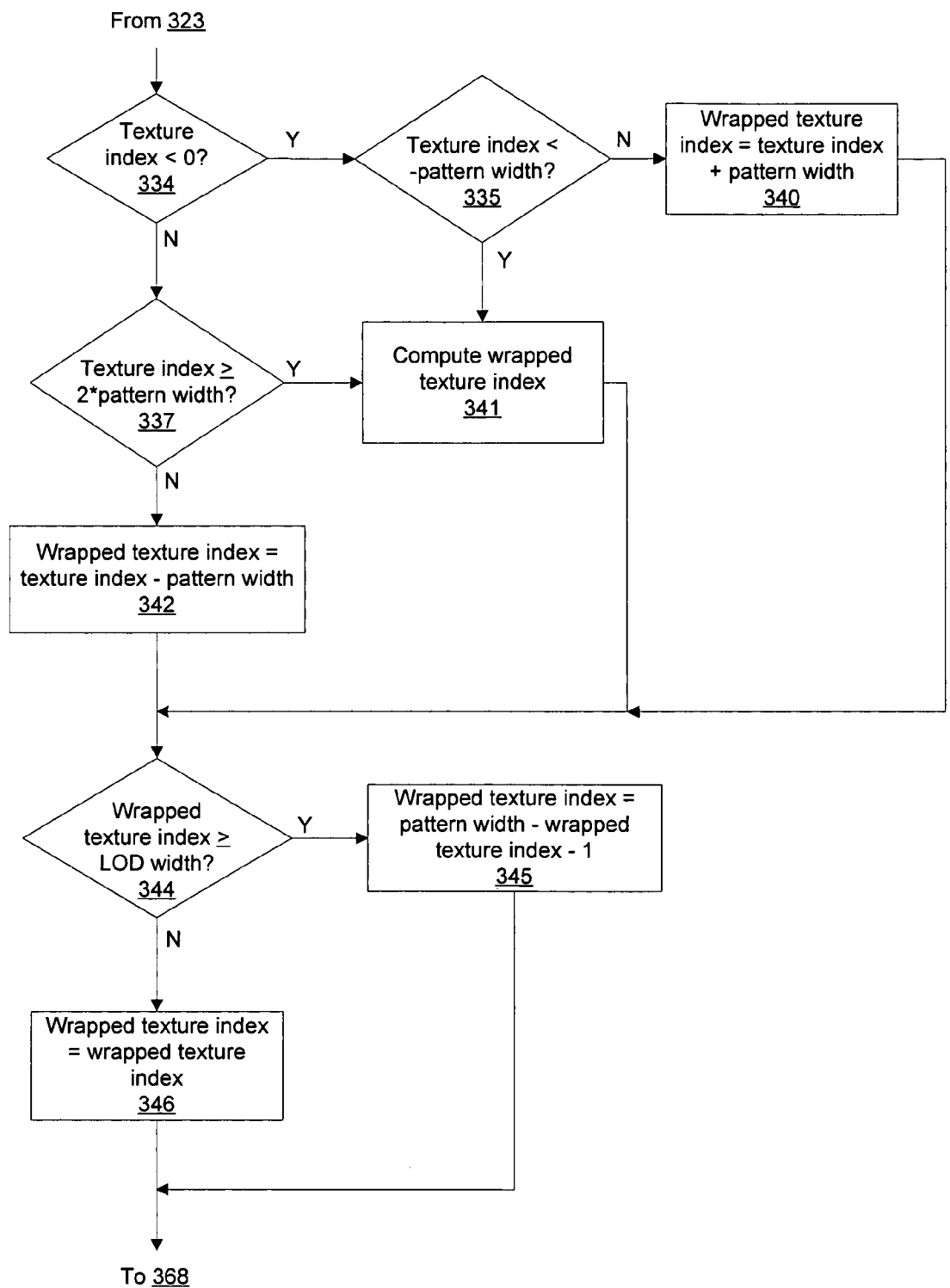
FIG. 3G illustrates an embodiment of a method of producing a wrapped texture index using a perturbed texture coordinate and a mirror wrap mode in accordance with one or more aspects of the present invention.

FIG. 3G illustrates an embodiment of a method of performing step 324 of FIG. 3C, i.e., producing a mirror wrapped texture map index using a perturbed texture coordinate in accordance with one or more aspects of the present invention. Steps 334, 335, and 337 are completed as described in conjunction with FIG. 3F. Step 340 is completed in the same manner as step 336 described in conjunction with FIG. 3F. Step 342 is completed in the same manner as step 339 described in conjunction with FIG. 3F. In step 341 the wrapped texture index, e.g., i', is computed using the following equation:

$i' = i$ mod (pattern width), where i is the texture index computed in step 313 and mod is the modulus operator. Using the mod operator extracts only the remainder when i is divided by the pattern width.

In one embodiment of a table used to compute the wrapped texture index when the mirror wrap mode is selected and the anisotropic perturbation is not greater than 9 is shown in Table 7. Table 7 does not include entries for an LOD width of 1 because the only valid integer value for the wrapped texture index is 0. Table 7 does not include entries for LOD widths which are powers of two, such as 2, 4, and 8. Table 7 includes an entry for each pattern width (2*LOD width for the mirror wrap mode) that is less than the anisotropic perturbation. Table 7 also includes an entry for each texture index that is greater than the pattern width.

TABLE 7

| texture index | LOD width | | | | |
|---|---|---|---|---|---|
| | 3 | 5 | 6 | 7 | 9 |
| −9 | 2 | 1 | 3 | 5 | 8 |
| −8 | 1 | 2 | 4 | 6 | 7 |
| −7 | 0 | 3 | 5 | 6 | 6 |
| −6 | 0 | 4 | 5 | 5 | 5 |
| −5 | 1 | 4 | 4 | 4 | 4 |
| −4 | 2 | 3 | 3 | 3 | 3 |
| −3 | 2 | 2 | 2 | 2 | 2 |
| −2 | 1 | 1 | 1 | 1 | 1 |
| −1 | 0 | 0 | 0 | 0 | 0 |
| 0 | 0 | 0 | 0 | 0 | 0 |
| 1 | 1 | 1 | 1 | 1 | 1 |
| 2 | 2 | 2 | 2 | 2 | 2 |
| 3 | 2 | 3 | 3 | 3 | 3 |
| 4 | 1 | 4 | 4 | 4 | 4 |
| 5 | 0 | 4 | 5 | 5 | 5 |
| 6 | 0 | 3 | 5 | 6 | 6 |
| 7 | 1 | 2 | 4 | 6 | 7 |
| 8 | 2 | 1 | 3 | 5 | 8 |
| 9 | 2 | 0 | 2 | 4 | 8 |
| 10 | 1 | 0 | 1 | 3 | 7 |
| 11 | 0 | 1 | 0 | 2 | 6 |
| 12 | 0 | 2 | 0 | 1 | 5 |
| 13 | | 3 | 1 | 0 | 4 |
| 14 | | 4 | 2 | 0 | 3 |
| 15 | | | 3 | 1 | 2 |
| 16 | | | | 2 | 1 |
| 17 | | | | | 0 |
| 18 | | | | | 0 |

In another embodiment a function may be used to compute the wrapped texture index. Alternatively, the function may be used to generate wrapped texture indices stored in a lookup table. The code in Table 8 represents such a function, where w is the LOD width. By way of illustration, the code is defined using C. However, any other language may be used to define the function.

TABLE 8

```
#define ANISODEL  9
// max aniso perturbation (8 would probably work)
#define POSDEL    (ANISODEL + 1)
// max expected positive delta (add the 1 for the +1 for tap)
#define NEGDEL    (−ANISODEL)   // max expected negative delta
// i coming in for mirror prior was in range 0...2w−1
// the new range is [0, 2w−1]+[NEGDEL,POSDEL] = −9...2w+9
// however, since the function we are implementing is
// if (i < 0) u = −i−1; i %= 2 * w; if (i >= w) i = 2w − 1 − i
// thus after the first if, i' is [0, MAX(9, 2w+9)]
// we have a problem only if i' cannot be brought into range by subtract-
ing
// 2w once this occurs only if i' >= 4w. thus, we have
// MAX(9, 2w+9) >= 4w. Solving for w gives w <= 9/2 or w <= 4.
//
```

TABLE 8-continued

```
// we can reduce the number of concatenated operations for mirror though
// if we restrict the maximum range of i' to be such that
// i'−2w <= w−1 -- that is, once you subtract 2w you are done.
// so we have MAX(9, 2w+9) >= 3w
#define MIRROR_TABLE_LIMIT MAX(−NEGDEL/3, (POSDEL−1))
static
int mirror_table(int i, int w)
{
    assert (i >= NEGDEL && i <= 2*w−1 + POSDEL);
    if (i < 0)
        i = ~i;
    i = i % (2 * w);
    assert (i >= 0);    // no C language misfeature
    if (i >= w)
        i = 2 * w − 1 − i;
    return i;
}
```

Following step 340, step 341, or step 342, the method proceeds to step 344. In step 344, the method determines if the wrapped texture index is greater than or equal to the LOD width, and, if so, then the method proceeds to step 345. In step 345 the wrapped texture index is computed as the difference between the pattern width−1 and the wrapped texture index. Otherwise, in step 346 the wrapped texture index is not modified. After producing the wrapped texture index in step 345 or step 346, the method proceeds to step 368 in FIG. 3B.

In another embodiment a function may be used to compute the wrapped texture index when the mirror wrap mode is used. The code shown in Table 9 represents such a function, where w is LOD width, wm1 is (LOD width−1), MIRROR_TABLE_LIMIT is the maximum anisotropic perturbation, twow is 2*LOD width, and the mirror_table function is used to access Table 7, the mirror wrap lookup table, or the like. By way of illustration, the code is defined using C. However, any other language may be used to define the function.

TABLE 9

```
if (POW2(w))
    i = ((i & w) ? ~i : i) & wm1;
else if (w <= MIRROR_TABLE_LIMIT)
    i = mirror_table(i, w); // compute mirror(i, width); output is
                            0...w−1
else
{
    if (i < 0)
        i = ~i;
    if (i >= twow)
    {
        i −= twow;
        assert (i <= w−1); // having done this we know that i <=
                           w−1
    }
    else if (i >= w)
        i = twow − 1 − i;
}
```

Persons skilled in the art will appreciate that any system configured to perform the method steps of FIGS. 3B, 3C, 3D, 3E, 3F, and 3G, or their equivalents, is within the scope of the present invention. Furthermore, persons skilled in the art will appreciate that the method steps of FIGS. 3B, 3C, 3D, 3E, 3F, and 3G may be extended to support non-square texture maps. For example, LOD width may be replaced with an LOD height, or in the case of three-dimensional textures an LOD depth may also be used. Additionally, each dimension may have a separate wrap mode specified for it.

Figure 4A:
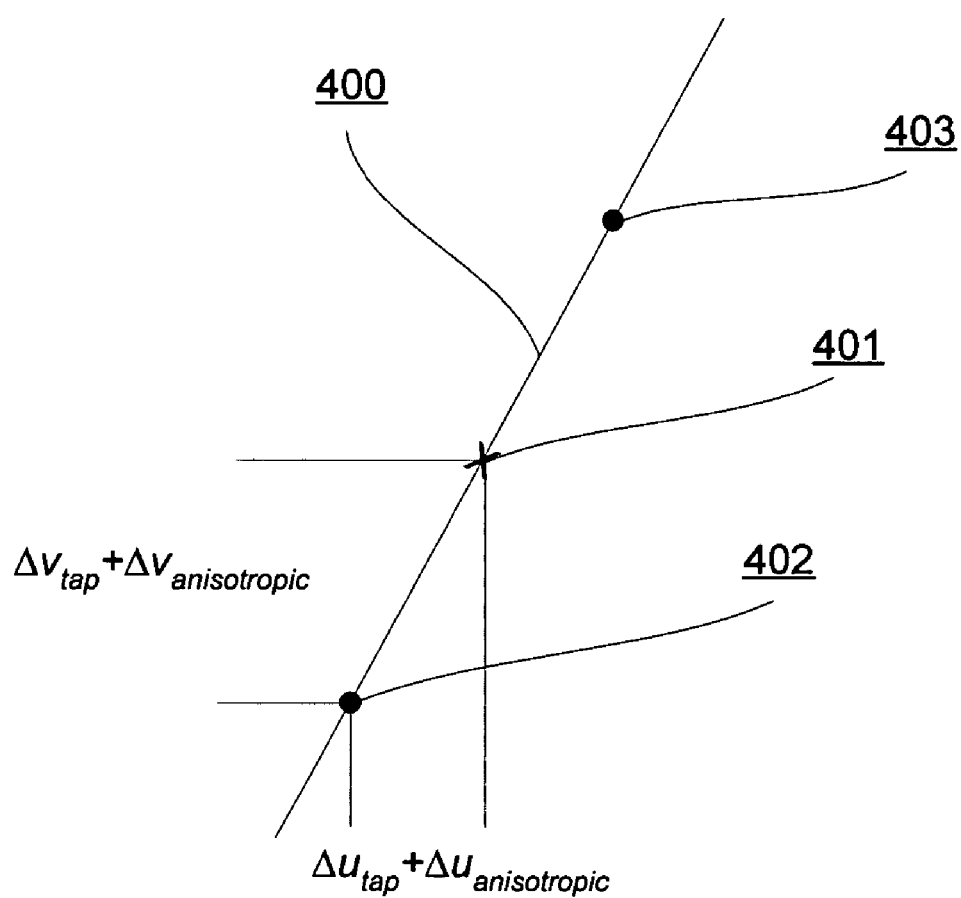
FIG. 4A illustrates perturbed texture coordinates in accordance with one or more aspects of the present invention.

FIG. 4 illustrates perturbed texture coordinates in accordance with one or more aspects of the present invention. Four taps are used to compute a bilinearly interpolated texture sample for each coordinate. When anisotropic filtering is used, the tap perturbation, e.g., 0.5, is subtracted from an anisotropically perturbed texture coordinate, u' to produce a perturbed texture coordinate, $u_0'$. Likewise, the tap perturbation, e.g., 0.5, is added to the anisotropically perturbed texture coordinate to produce a perturbed texture coordinate, $u_1'$. In one embodiment, $u_0 = u' - 0.5$ and $u_1 = u + 1$ when the repeat wrap mode is selected. Similarly, in one embodiment, $u_0 = u' - 1.0$ and $u_1 = u_0 + 2$ when the mirror wrap mode is selected. In some embodiments a tap perturbation, e.g., 0.5 or 1.0, is subtracted from a texture coordinate, u to produce $u_0$ and the tap perturbation is subtracted from u to produce $u_1$.

The tap computation may be combined with the anisotropic perturbation, such that each texture coordinate is perturbed to produce two perturbed texture coordinates. Specifically, the sum of a tap perturbation, $\Delta u_{tap}$ is summed with the anisotropic perturbation, $\Delta u_{anisotropic}$, and subtracted from the u texture coordinate corresponding to Position 401 to produce the perturbed u texture coordinate corresponding to Position 402. Likewise, the sum of a tap perturbation, $\Delta u_{tap}$ is summed with the anisotropic perturbation, $\Delta u_{anisotropic}$, and summed with the u texture coordinate corresponding to Position 401 to produce the perturbed u texture coordinate corresponding to Position 403. Similarly, the perturbed v texture coordinates corresponding to Positions 402 and 403 may be computed based on the v texture coordinate corresponding to Position 401.

Figure 4B:
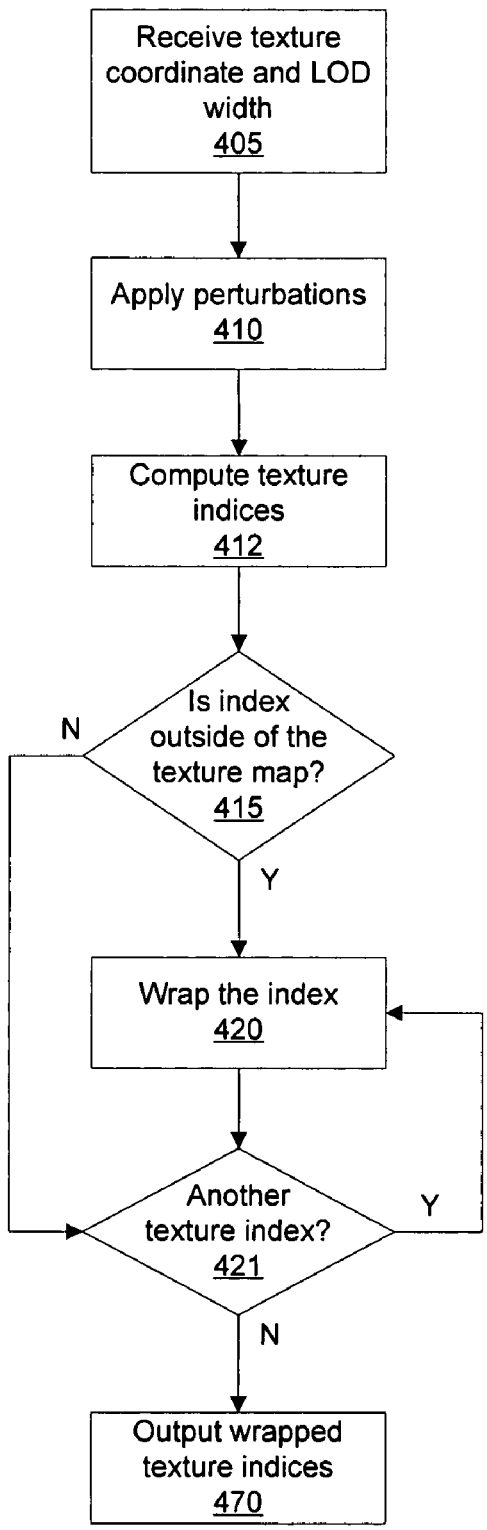
FIG. 4B illustrates another embodiment of a method of producing a wrapped texture map coordinate for a non-power of two texture map in accordance with one or more aspects of the present invention.

FIG. 4B illustrates another embodiment of a method of producing a wrapped texture map index for a non-power of two texture map in accordance with one or more aspects of the present invention. Any tap perturbations and anisotropic perturbations are applied to the texture coordinates prior to computing the wrapped texture indices. In step 405 an unnormalized texture coordinate and a LOD width are received. In step 410 an anisotropic perturbation and one or more tap perturbations are applied to the unnormalized texture coordinate to generate one or more anisotropically perturbed texture coordinates, e.g., $u_0$ and $u_1$. In one embodiment, the anisotropic perturbation is added to the unnormalized texture coordinate. Alternatively, the anisotropic perturbation is subtracted from the unnormalized texture coordinate.

In step 414 a texture index is produced for each perturbed texture coordinate, e.g., $i_0$=floor $(u_0-0.5)$ and $i_1=i_0+1$. In step 415 the method determines if a texture index produced in step 414 lies outside of the texture map corresponding to the LOD, and, if not, the texture index is the wrapped texture index and the method proceeds to step 421. Otherwise, the method proceeds to step 420.

Step 420 is completed as previously described in conjunction with step 317 of FIG. 3C. Persons skilled in the art will appreciate that any system configured to perform the method steps of FIG. 4B their equivalents, may be configured to use a perturbed texture coordinate that includes a tap perturbation, such as $u_0'$ or $u_1'$ to compute a wrapped texture index. In step 470 the wrapped texture indices are output.

Figure 5A:
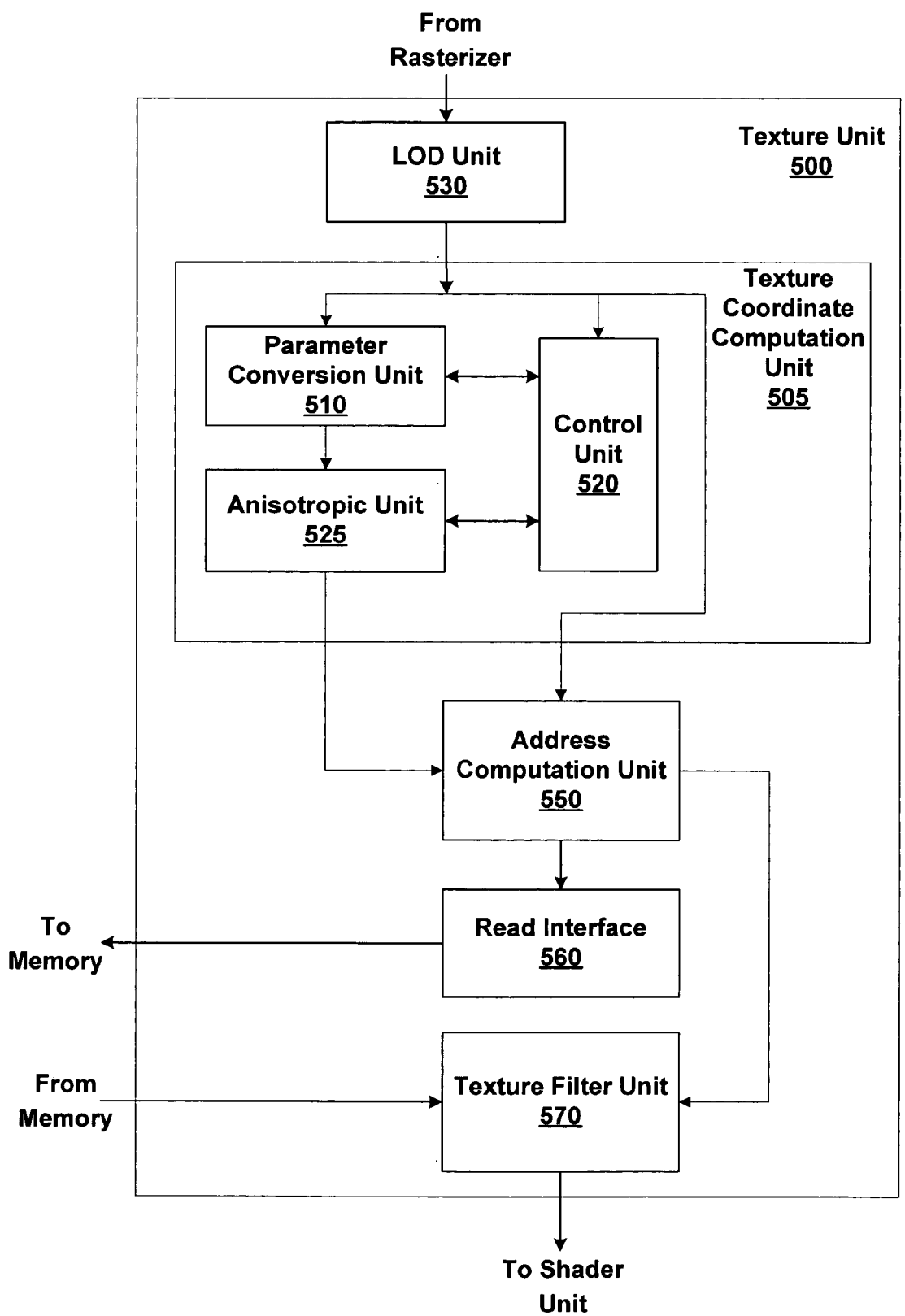
FIG. 5A is a block diagram of a portion of a shader unit including a texture unit in accordance with one or more aspects of the present invention.

FIG. 5A is a block diagram of a portion of a shader unit including a Texture Unit 500 in accordance with one or more aspects of the present invention. The texture unit may be included in a graphics processing pipeline, to be described further herein in conjunction with FIG. 6. In some embodiments, Texture Unit 500 receives data from a rasterizer, e.g., program instructions, and parameters associated with fragments (texture IDs, texture parameters such as s and t, and the like). A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments.

Texture Unit 500 includes an LOD Unit 530 which receives texture parameters and determines LOD values using a technique known to those skilled in the art. In some embodiments LOD Unit 530 outputs a LOD width and a LOD height corresponding to each LOD value that is output. Texture Unit 500 includes a Texture Coordinate Computation Unit 505. A Control Unit 520 within Texture Coordinate Computation Unit 505 processes the program instructions, such as instructions to set the wrap mode.

Parameters produced by the rasterizer are output by LOD Unit 530 and received by a Parameter Conversion Unit 510 within Texture Coordinate Computation Unit 505. Parameter Conversion Unit 510 computes unnormalized texture coordinates, e.g., u and v, and the like, using techniques known to those skilled in the art. In some embodiments Parameter Conversion Unit 510 computes a LOD width and a LOD height corresponding to each LOD value. The unnormalized texture coordinates are output by Parameter Conversion Unit 510 to an Anisotropic Unit 525.

Anisotropic Unit 525 may include storage elements, e.g., registers, to store one or more tables used to compute wrapped texture indices. Anisotropic Unit 525 may also store LOD width and LOD heights for texture maps. In an alternate embodiment, Anisotropic Unit 525 receives LOD width and LOD height values from Control Unit 520. Anisotropic Unit 525 receives unnormalized texture coordinates and produces wrapped texture indices based on the wrap mode, as described in conjunction with FIG. 5B.

Anisotropic Unit 525 outputs wrapped texture indices and anisotropic weights to an Address Computation Unit 550. Address Computation Unit 550 uses wrapped texture indices such as, i' and j' and other texture information, such as a texture ID received by Texture Unit 500, to determine addresses for reading texels from memory. In some embodiments Texture Coordinate Computation Unit 505 determines and outputs tap weights for use in filtering the texels read from memory. In other embodiments, another unit (not shown) in Texture Unit 500 determines the tap weights, using techniques known to those skilled in the art.

Address Computation Unit 550 outputs the addresses to a Read Interface 560. Read Interface 560 outputs the addresses and a read request to a memory, e.g., cache, RAM, ROM, or the like. Texels read from memory are received from the memory by a Texture Filter Unit 570. Texture Filter Unit 570 receives the tap weights and the anisotropic weights from Address Computation Unit 550 and filters the texels read from memory using bilinear interpolation, trilinear interpolation, anisotropic filtering, or the like, to produce filtered texels. The filtered texels are output to a shader unit, described further herein, to compute a color for each fragment.

Figure 5B:
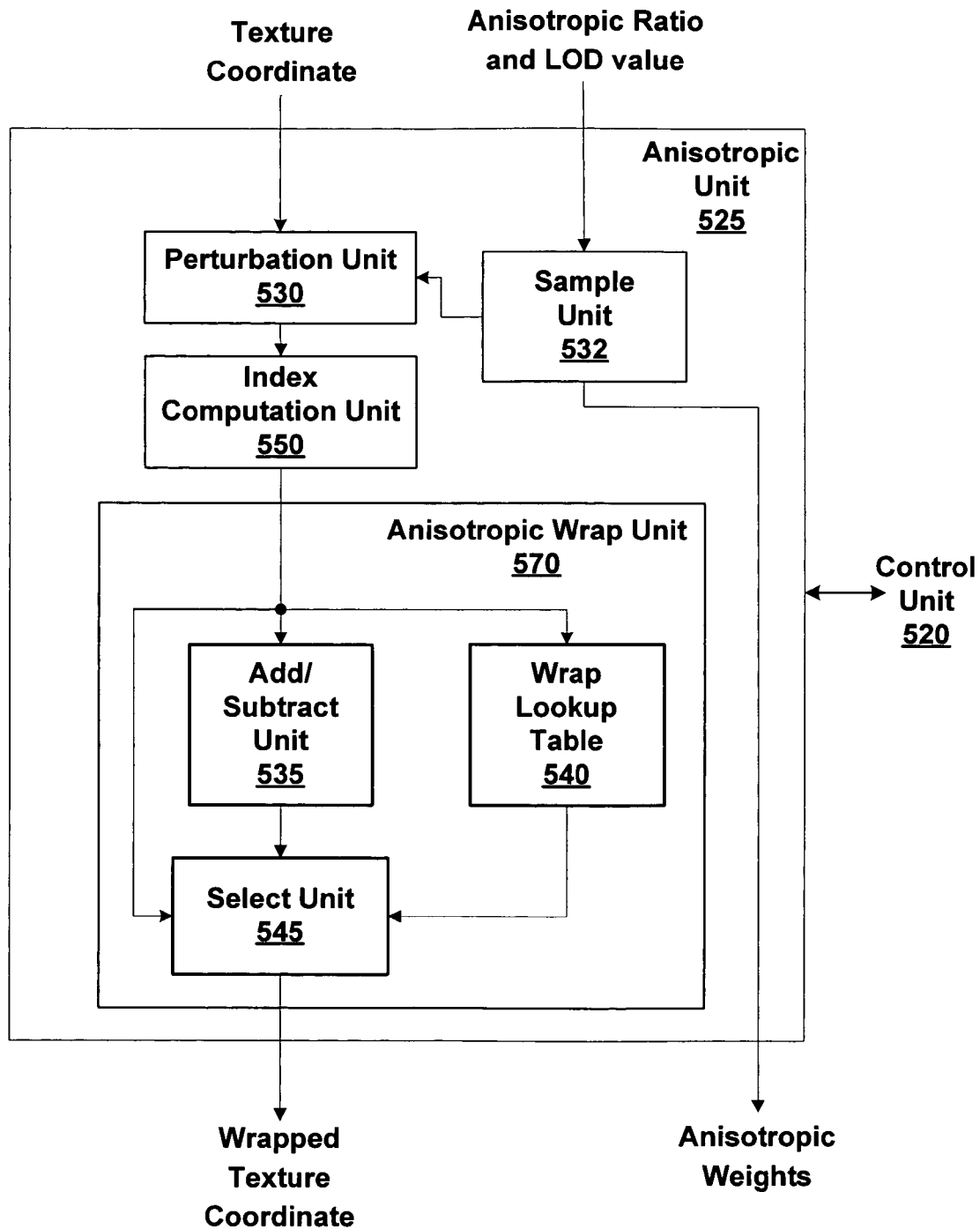
FIG. 5B is a block diagram of a portion of the texture coordinate computation unit of FIG. 5A in accordance with one or more aspects of the present invention.

FIG. 5B is a block diagram of a portion of Texture Coordinate Computation Unit 505 of FIG. 5A in accordance with one or more aspects of the present invention. A Perturbation Unit 530 within Anisotropic Unit 525 receives an unnormalized texture coordinate from Parameter Conversion Unit 510 and applies a tap perturbation, an anisotropic perturbation, or a combination of the tap perturbation and the anisotropic perturbation to compute a perturbed texture coordinate. A Sample Unit 532 receives an anisotropic ratio and the LOD value from Control Unit 520 and computes the anisotropic perturbation and anisotropic weights using techniques known to those skilled in the art. The wrap mode and tap perturbation are provided by Control Unit 520. Additional perturbed texture coordinates may be computed using the unnormalized texture coordinate.

The perturbed texture coordinate is output to an Index Computation Unit 550 which computes one or more texture indices for each perturbed texture coordinate. Index Computation Unit 550 outputs the texture indices to an Add/Subtract Unit 535 and a Wrap Lookup Table 540 within Anisotropic Wrap Unit 570. Add/Subtract Unit 535 and Wrap Lookup Table 540 receive the LOD width (or pattern width) and wrap mode from Index Computation Unit 550 or Control Unit 520. Add/Subtract Unit 535 subtracts a pattern width from a texture index when the texture index is a positive value to produce an adjusted texture index. Add/Subtract Unit 535 adds a pattern width to the texture index when the texture index is a negative value to produce the adjusted texture index. Wrap Lookup Table 540 is indexed using the wrap mode, the texture index, and the pattern width. Wrap Lookup Table 540 outputs a remainder texture index. Wrap Lookup Table 540 includes storage elements that are written by Control Unit 520. In an alternate embodiment, Wrap Lookup Table 540 is a ROM.

A Select Unit 545 receives the texture index, wrap mode, adjusted texture index, and remainder texture index, and produces the wrapped texture index. Select Unit 545 computes the wrapped texture index when the wrap mode is "clamp to edge" or "clamp to border." When mirror or repeat wrap mode is selected, Select Unit 545 determines if the adjusted texture index is negative, equal to the pattern width, or greater than the pattern width, and if so, the remainder texture index is output as the wrapped texture coordinate. Otherwise, when mirror or repeat wrap modes are selected, Select Unit 545 outputs the adjusted texture index as the wrapped texture index. Persons skilled in the art will appreciate that any system configured to perform the functions of FIG. 5B, or its equivalent, is within the scope of the present invention.

Figure 6:
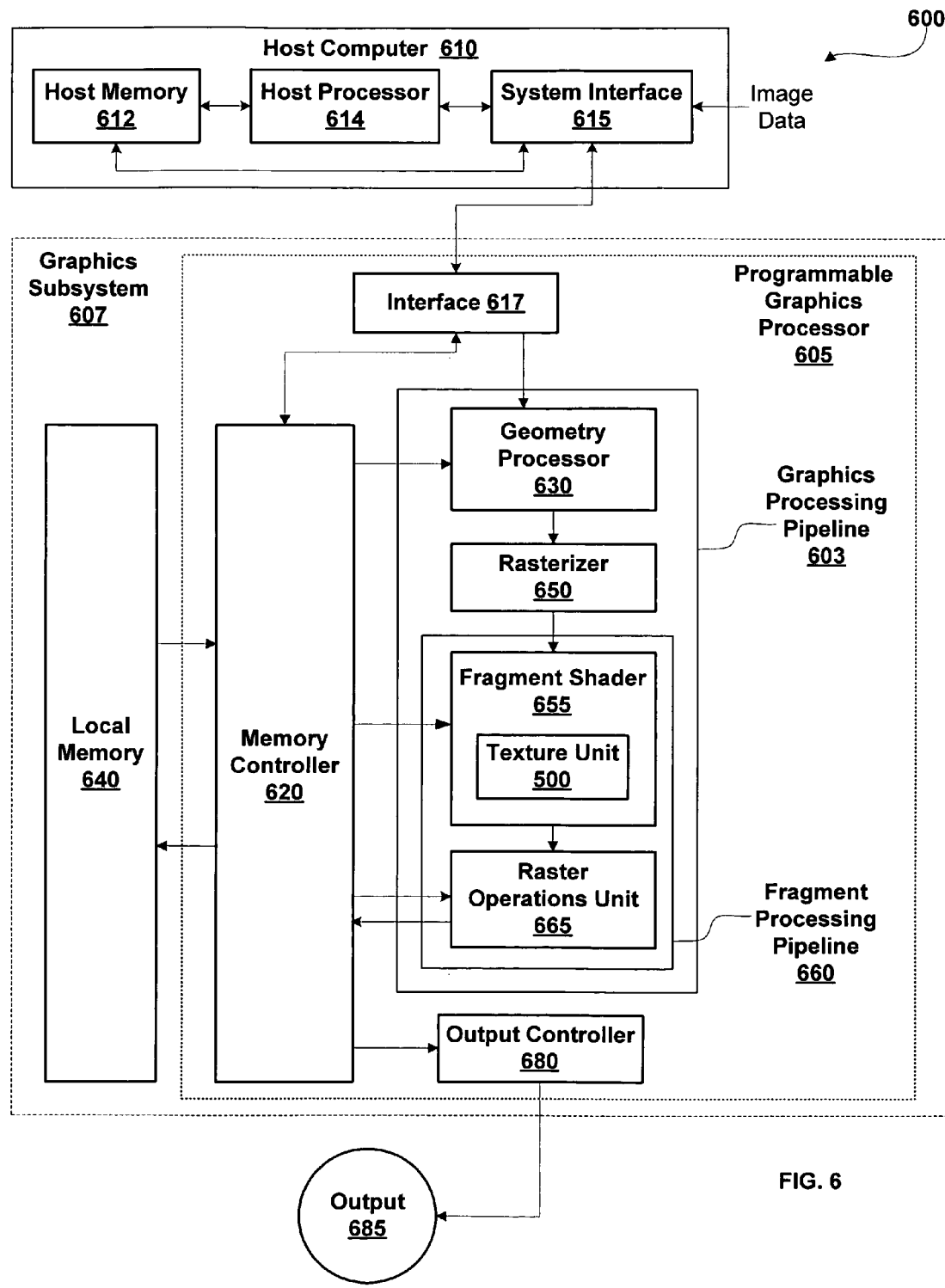
FIG. 6 is a block diagram of an exemplary embodiment of a respective computer system in accordance with one or more aspects of the present invention including a host computer and a graphics subsystem.

FIG. 6 is a block diagram of an exemplary embodiment of a Computing System generally designated 600 and including a Host Computer 610 and a Graphics Subsystem 607 including an embodiment of Texture Unit 500. Computing System 600 may be a desktop computer, server, laptop computer, palm-sized computer, tablet computer, game console, set-top box, personal digital appliance, tethered Internet appliance, portable gaming system, cellular/mobile telephone, computer based simulator, or the like. Host computer 610 includes Host Processor 614 that may include a system memory controller to interface directly to Host Memory 612 or may communicate with Host Memory 612 through a System Interface 615. System Interface 615 may be an I/O (input/output) interface or a bridge device including the system memory controller to interface directly to Host Memory 612. Examples of System Interface 615 known in the art include Intel® Northbridge and Intel® Southbridge. System Interface 615 can receive image data, such as video images, or the like. The image data, including non-power of two dimension images can be stored in Host Memory 612 or a Local Memory 640 within Graphics Subsystem 607 for use as a texture map.

Host computer 610 communicates with Graphics Subsystem 607 via System Interface 615 and an Interface 617. Graphics Subsystem 607 includes Local Memory 640 and a Programmable Graphics Processor 605. Programmable Graphics Processor 605 uses memory to store graphics data, including texture maps, and program instructions, where graphics data is any data that is input to or output from computation units within Programmable Graphics Processor 605. Texture maps stored in graphics memory may include non-power of two texture maps. Graphics memory is any memory used to store graphics data or program instructions to be executed by Programmable Graphics Processor 605. Graphics memory can include portions of Host Memory 612, Local Memory 640 directly coupled to Programmable Graphics Processor 605, storage resources coupled to the computation units within Programmable Graphics Processor 605, and the like. Storage resources can include register files, caches, FIFOs (first in first out memories), and the like.

In addition to Interface 617, Programmable Graphics Processor 605 includes a Graphics Processing Pipeline 603, a Memory Controller 620 and an Output Controller 680. Data and program instructions received at Interface 617 can be passed to a Geometry Processor 630 within Graphics Processing Pipeline 603 or written to Local Memory 640 through Memory Controller 620. In addition to communicating with Local Memory 640, and Interface 617, Memory Controller 620 also communicates with Graphics Processing Pipeline 603 and Output Controller 680 through read and write interfaces in Graphics Processing Pipeline 603 and a read interface in Output Controller 680.

Within Graphics Processing Pipeline 605, Geometry Processor 630 and a programmable graphics fragment processing pipeline, Fragment Processing Pipeline 660, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 630 and Fragment Processing Pipeline 660 are optionally configured such that data processing operations are performed in multiple passes through Graphics Processing Pipeline 603 or in multiple passes through Fragment Processing Pipeline 660. Each pass through Programmable Graphics Processor 605, Graphics Processing Pipeline 603 or Fragment Processing Pipeline 660 concludes with optional processing by a Raster Operations Unit 665.

Vertex programs are sequences of vertex program instructions compiled by Host Processor 614 for execution within Geometry Processor 630 and Rasterizer 650. Shader programs are sequences of shader program instructions compiled by Host Processor 614 for execution within Fragment Processing Pipeline 660. Geometry Processor 630 receives a stream of program instructions (vertex program instructions and shader program instructions) and data from Interface 617 or Memory Controller 620, and performs vector floating-point operations or other processing operations using the data. The program instructions configure subunits within Geometry Processor 630, Rasterizer 650 and Fragment Processing Pipeline 660. The program instructions and data are stored in graphics memory, e.g., portions of Host Memory 612, Local Memory 640, or storage resources within Programmable Graphics Processor 605. When a portion of Host Memory 612 is used to store program instructions and data the portion of Host Memory 612 can be uncached so as to increase performance of access by Programmable Graphics Processor 605. Alternatively, configuration information, including wrap mode information, is written to registers within Geometry Processor 630, Rasterizer 650 and Fragment Processing Pipeline 660 using program instructions, encoded with the data, or the like.

Data processed by Geometry Processor 630 and program instructions are passed from Geometry Processor 630 to a Rasterizer 650. Rasterizer 650 is a sampling unit that processes primitives and generates sub-primitive data, such as fragment data, including parameters associated with fragments (texture IDs, texture parameters, and the like). Rasterizer 650 converts the primitives into sub-primitive data by performing scan conversion on the data processed by Geometry Processor 630. Rasterizer 650 outputs fragment data and shader program instructions to Fragment Processing Pipeline 660.

The shader programs configure the Fragment Processing Pipeline 660 to process fragment data by specifying computations and computation precision. Fragment Shader 655 is optionally configured by shader program instructions such that fragment data processing operations are performed in multiple passes within Fragment Shader 655. Fragment Shader 655 includes an embodiment of previously described Texture Unit 500. In one embodiment Texture Unit 500 is configured to read shader program instructions stored in Local Memory 640 or Host Memory 612 via Memory Controller 620.

Fragment Shader 655 outputs processed fragment data, e.g., color and depth, and codewords generated from shader program instructions to Raster Operations Unit 665. Raster Operations Unit 665 includes a read interface and a write interface to Memory Controller 620 through which Raster Operations Unit 665 accesses data stored in Local Memory 640 or Host Memory 612. Raster Operations Unit 665 optionally performs near and far plane clipping and raster operations, such as stencil, z test, blending, and the like, using the fragment data and pixel data stored in Local Memory 640 or Host Memory 612 at a pixel position (image location specified by x,y coordinates) associated with the processed fragment data. The output data from Raster Operations Unit 665 is written back to Local Memory 640 or Host Memory 612 at the pixel position associated with the output data and the results, e.g., image data are saved in graphics memory.

When processing is completed, an Output 685 of Graphics Subsystem 607 is provided using Output Controller 680. Alternatively, Host Processor 614 reads the image stored in Local Memory 640 through Memory Controller 620, Interface 617 and System Interface 615. Output Controller 680 is optionally configured by opcodes to deliver data to a display device, network, electronic control system, another computing system, such as Computing System 600, another graphics subsystem, such as Graphics Subsystem 607, or the like.

The invention has been described above with reference to specific embodiments. Persons skilled in the art will recognize, however, that various modifications and changes may be made thereto without departing from the broader spirit and scope of the invention as set forth in the appended claims. For example, in alternative embodiments, the method set forth herein may be implemented either partially or entirely in a software program or a fragment program executed by Fragment Shader 655. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A method of using a non-power of two texture map, where non-power of two is x for $x \neq 2$ and i being an integer, comprising:
    receiving a texture map coordinate corresponding to the non-power of two texture map;
    receiving an LOD width corresponding to the non-power of two texture map;
    applying an anisotropic perturbation to the texture map coordinate to produce a perturbed texture map coordinate;
    computing a texture map index based on the perturbed texture map coordinate;
    determining whether the texture map index is positioned outside of the non-power of two texture map; and
    computing a wrapped texture map index based on the texture map index and the LOD width when the texture map index is outside of the non-power of two texture map.

2. The method of claim 1, wherein the wrapped texture map index is used to determine an address of a texel within the non-power of two texture map.

3. The method of claim 1, further comprising the step of applying a tap perturbation to the texture map coordinate to produce the perturbed texture map coordinate.

4. The method of claim 1, further comprising the step of combining a tap perturbation with the anisotropic perturbation prior to the step of applying the anisotropic perturbation to the texture map coordinate to produce the perturbed texture map coordinate.

5. The method of claim 1, wherein the step of computing the wrapped texture map index comprises accessing a lookup table using the texture map index.

6. The method of claim 5, wherein the lookup table is accessed using the LOD width and a wrap mode.

7. The method of claim 1, further comprising the step of setting the wrapped texture map index to the texture map index when the texture map index is not outside of the non-power of two texture map.

8. The method of claim 1, wherein the wrapped texture map index is computed responsive to a wrap mode selected from the group consisting of repeat, mirror, clamp to border, and clamp to edge.

9. The method of claim 1, wherein the non-power of two texture map is a video image.

10. The method of claim 1, wherein the step of computing the wrapped texture map index comprises subtracting a pattern width based on the LOD width from the texture index.

11. The method of claim 1, wherein the step of computing the wrapped texture map index comprises summing pattern width based on the LOD width with the texture index.

12. An anisotropic unit for determining texture map indices for non-power of two texture maps, where non-power of two is $x^i$ for $x \neq 2$ and i being an integer, comprising:
    a perturbation unit configured to apply a perturbation to a texture coordinate corresponding to a non-power of two texture map and produce a perturbed texture coordinate;
    an index computation unit configured to receive the perturbed texture coordinates and produce a texture map index;
    an anisotropic wrap unit configured to receive the texture map index and output a wrapped texture map index for the non-power of two texture map whether the texture map index is inside or outside of the non-power of two texture map, and wherein the anisotropic wrap unit comprises a computation unit configured to produce the wrapped texture index using the texture map index and an LOD width or a pattern width based on the LOD width when the texture map index is outside of the non-power of two texture map corresponding to the LOD width.

13. The anisotropic unit of claim 12, wherein the perturbation includes one of an anisotropic perturbation or a tap perturbation.

14. The anisotropic unit of claim 12, wherein the anisotropic wrap unit applies a wrap mode selected from the group consisting of repeat, mirror, clamp to border, and clamp to edge to the texture map index outside of the non-power of two texture map.

15. The anisotropic unit of claim 12, wherein the anisotropic wrap unit comprises a wrap lookup table storing wrapped texture map indices.

16. The anisotropic unit of claim 12, wherein the anisotropic wrap unit comprises a computation unit configured to output the texture map index as the wrapped texture index when the texture map index is not outside of the non-power of two texture map.

17. The anisotropic unit of claim 12, wherein the anisotropic unit is included in a texture unit, the texture unit comprising an address computation unit configured to receive the wrapped texture index and produce an address corresponding to a texel in the non-power of two texture map.

18. The anisotropic unit of claim 17, wherein the texture unit is included within a programmable graphics processor, the programmable graphics processor including a shader unit configured to receive the texel.

19. An anisotropic unit for determining texture map indices for non-power of two texture maps, where non-power of two is $x^i$ for $x \neq 2$ and i being an integer, comprising:

a perturbation unit configured to apply a perturbation to a texture coordinate corresponding to a non-power of two texture map and produce a perturbed texture coordinate;

an index computation unit configured to receive the perturbed texture coordinates and produce a texture map index;

an anisotropic wrap unit configured to receive the texture map index and output a wrapped texture map index for the non-power of two texture map whether the texture map index is inside or outside of the non-power of two texture map; and wherein the anisotropic wrap unit comprises a computation unit configured to output the texture map index as the wrapped texture index when the texture map index is not outside of the non-power of two texture map.

20. The anisotropic unit of claim 19, wherein the anisotropic unit is included in a texture unit, the texture unit comprising an address computation unit configured to receive the wrapped texture index and produce an address corresponding to a texel in the non-power of two texture map; and wherein the texture unit is included within a programmable graphics processor, the programmable graphics processor including a shader unit configured to receive the texel.

* * * * *